United States Patent [19]

Covitch et al.

[11] Patent Number: 4,540,716

[45] Date of Patent: Sep. 10, 1985

[54] METHOD FOR MAKING FINELY DIVIDED PERFLUOROCARBON COPOLYMER

[75] Inventors: Michael J. Covitch, Cleveland Hts.; Gary G. Sweetapple, Painesville, both of Ohio

[73] Assignee: Diamond Shamrock Chemicals Company, Dallas, Tex.

[21] Appl. No.: 457,580

[22] Filed: Jan. 13, 1983

[51] Int. Cl.$^3$ .......................... C08D 5/20; C08F 6/00
[52] U.S. Cl. ...................................... 521/28; 524/544; 528/492; 528/493; 528/494; 528/495; 528/496; 428/402
[58] Field of Search ................. 524/544; 521/28, 38; 528/491–498; 428/402

[56] References Cited

U.S. PATENT DOCUMENTS

| | | | |
|---|---|---|---|
| 2,732,357 | 1/1956 | Sprung | 524/544 |
| 2,876,206 | 3/1959 | Green | 524/544 |
| 3,615,024 | 10/1971 | Michaels | 264/41 |
| 4,110,529 | 8/1978 | Stoy | 528/492 |
| 4,341,685 | 7/1982 | Miyake et al. | 524/544 |
| 4,414,280 | 11/1983 | Silva et al. | 521/27 |

FOREIGN PATENT DOCUMENTS 791263 2/1958 United Kingdom ................ 524/544

*Primary Examiner*—Joseph L. Schofer
*Assistant Examiner*—Peter F. Kulkosky
*Attorney, Agent, or Firm*—William A. Skinner; Woodrow W. Ban

[57] ABSTRACT

A method for making a quite finely divided particulate copolymeric perfluorocarbon having pendant cation exchange functional groups, and having an equivalent weight of at least in excess of 900 but not greater than about 1500. In the method, the perfluorocarbon copolymer is solvated in a solvent and then precipitated from solution by addition of a substance miscible in the solvent but having essentially no capability for solvating the perfluorocarbon copolymer. The method is conducted at a temperature generally below about 300° C.

6 Claims, No Drawings

METHOD FOR MAKING FINELY DIVIDED PERFLUOROCARBON COPOLYMER

FIELD OF THE INVENTION

This invention relates to methods for making finely divided thermoplastic resin particulates and more specifically relates to methods for making quite finely divided perfluorocarbon copolymer having pendant ion exchange functionality.

BACKGROUND OF THE INVENTION

Perfluorocarbon copolymers offer generally substantial resistance to corrosive effects of aggressive chemicals and have consequently found favor when used for fabrication of structures and or the coating of structures for use in contact with such aggressive chemicals. Additionally, perfluorocarbon copolymers have been provided with pendant ion exchange functionality, and have found considerable utility for a variety of tasks that can include functioning as a membrane in separating anode and cathode compartments within an electrochemical cell, and functioning, in powder form, as a catalyst for a variety of desirable organic reactions.

One perfluorocarbon copolymer finding particular acceptance, hereinafter being the substance referred to by the term perfluorocarbon copolymer, is generally a copolymer of two monomers with one monomer being selected from a group including vinyl fluoride, hexafluoropropylene, vinylidene fluoride, trifluoroethylene, chlorotrifluoroethylene, perfluoro(alkylvinyl ether), tetrafluoroethylene and mixtures thereof.

The second monomer is selected from a group of monomers usually including or derived from $SO_2F$, that is a sulfonyl fluoride group, or a group including or derived from COF, that is carbonyl fluoride. Examples of such second monomers can be generically represented by the formula $CF_2=CFR_1SO_2F$ or $CF_2=CFR_1COF$. $R_1$ in the generic formula is a bifunctional perfluorinated radical comprising generally 1 to 8 carbon atoms but occasionally as many as 25 carbon atoms. One restraint upon the generic formula is a general requirement for the presence of at least one fluorine atom on the carbon atom adjacent the $SO_2F$ or COF, particularly where the functional group exists as the $(SO_2NH)_mQ$ form. In this form, Q can be hydrogen or an or alkaline earth metal cation and m is the valence of Q. The $R_1$ generic formula portion can be of any suitable or conventional configuration, but it has been found preferably that the vinyl radical comonomer join the $R_1$ group through an ether linkage.

Typical sulfonyl fluoride containing monomers are set forth in U.S. Pat. Nos. 3,282,875; 3,041,317; 3,560,568; 3,718,627 and methods of preparation of intermediate perfluorocarbon copolymers are set forth in U.S. Pat. Nos. 3,041,317; 2,393,967; 2,559,752 and 2,593,583. These perfluorocarbons generally have pendant $SO_2F$ based functional groups. Typical methyl carboxylate containing monomers are set forth in U.S. Pat. No. 4,349,422. Perfluorocarbon copolymers containing perfluoro(3,6-dioxa-4-methyl-7-octenesulfonyl fluoride) comonomer and/or methyl carboxylate monomers such as perfluoro(4,7-dioxa-5-methyl-8-nonenoate) have found particular acceptance in fabricating membranes for use in separating anode and cathode compartments. Conversion of sulfonyl fluoride groups to carboxylate groups is discussed in U.S. Pat. No. 4,151,053. The cationic exchange capability of the copolymeric perfluorocarbon having pendant sulfonyl and/or carbonyl functional groups is activated by saponification with a suitable or conventional compound such a strong caustic.

Often it is desired that perfluorocarbon copolymer be of an equivalent weight of between at least about 900 and about 1500 to provide a structure or catalyst having desirable performance characteristics. From time to time there the perfluorocarbon copolymer is to perform as a catalyst, it is desirable that perfluorocarbon copolymer be available in quite finely divided particulate form, the particles having a size distribution in a range of from about 10 to about 100 microns. Particles in such a size range may be generated by a procedure commonly known as cryogenic grinding, wherein the perfluorocarbon copolymer is subjected to a grinding or ball milling procedure at a quite low temperature (cryogenic). These cryogenic procedures can be quite expensive.

In another proposal, the perfluorocarbon copolymer can be prepared in finely divided particulate form as the copolymer is formed during polymerization in a suspension polymerization process. One difficulty with such forming techniques is that particles generated during copolymerization tend to be rather larger than may be desired. For example, Nafion ® 511, a duPont particulate product, upon analysis of a sample was 4.3% less than 44 microns
8.1% greater than 44 but less than 88 microns
26.1% greater than 88 but less than 212 microns
57.1% greater than 212 but less than 595 microns
4.4% greater than 595 microns Were a distribution of smaller particles available a desirably larger ratio of particles surface, that is catalytic surface to volume could be realized.

The use of alcohols to solvate particularly low equivalent weight perfluorocarbon copolymers is known. However, as yet, proposals for solvation of perfluorocarbon copolymer of equivalent weights in excess of about 900 have not proven generally satisfactory. Dissatisfaction has been at least partly attributable to a lack of suitable techniques for dispersing or solvating in part these higher equivalent weight perfluorocarbon copolymers.

At more elevated equivalent weights, perfluorocarbon copolymer contains PTFE (polytetrafluoroethylene) like crystallinity. As is well known in polymer chemistry, once crystalline polymer material commences appearing in a copolymer, dissolution becomes substantially more difficult. While temperature elevation is a frequently useful tool in such situations, with perfluorocarbon copolymers having pendant cation exchange functional groups, the usefulness of temperature elevation may be substantially limited. Known solvents for low equivalent weight copolymeric perfluorocarbons generally are possessed of a relatively low boiling point limiting the extent to which temperature elevation can be employed. In addition perfluorocarbon copolymer demonstrates a temperature degradation characteristic beginning to be significant at between about 250° C. and 300° C. or less.

For perfluorocarbon copolymers having pendant sulfonyl fluoride functionality, crystallized PTFE-like material begins to appear in the copolymer at between about an equivalent weight of 910 and 1050. Further, as described by Yeo in "Solubility Parameter of Perfluorosulfonated Polymer", perfluorocarbon solubility apparently is a function of the equivalent weight, becoming of substantial consideration above an equivalent weight of between about 910 and 1050 for sulfonyl fluoride functionality. Therefore solvents functioning upon lower equivalent weight material would appear not likely to function adequately at more elevated equivalent weight. Other articles such as: Seko et al "Perfluorocarboxylic Acid Membrane and Membrane Chlor-alkali Process Developed by Asahi Chemical Industry", Gierke et al "Morphology of Perfluorosulfonated Membrane Products", and Hashimoto et al "Structure of Sulfonated and Carboxylated Perfluorinated Ionomer Membranes", collected in Eisenberg et al "Perfluorinated Ionomer Membranes", Yomigama et al "Paper at No. 5 Caustic Soda Technical Forum, Kyoto Japan 11/81" and Starkweather "Crystallinity in Perfluorosulfonic Acid Ionomers and Related Polymers" further describe this phenomenon.

Particularly where particulate perfluorocarbon copolymer is to be employed as a catalyst, for example as an acid catalyst, relatively small particles tending to optimize the ratio of surface area to volume of perfluorocarbon copolymer are advantageous. A relatively inexpensive method for forming such particles having a relatively large selection of pendant functional groups available would likely find utility in the manufacture of these acid catalysts.

DISCLOSURE OF THE INVENTION

The present invention provides a method for making quite finely divided perfluorocarbon copolymer having pendant ion exchange functional groups, the particles being in a size range of from about 0.5 microns to about 100 microns. The ion exchange pendant functional groups for the polymeric perfluorocarbon are based upon or derived from either sulfonyl fluoride or carbonyl fluoride.

The copolymeric perfluorocarbon is solvated with a suitable solvent to produce a resulting solution having at least 0.5% by weight of the copolymeric perfluorocarbon. Solvation is accomplished at a temperature greater than room temperature but less than about 300° C.

A substance substantially miscible in the solvent is then identified and the solution is cooled to a temperature at least below the boiling point of the substance. The substance is then introduced into the solution in preferred embodiments in a quantity at least equal to the weight of solvent employed in forming the solution. The perfluorocarbon copolymer thereupon precipitates as a quite finely divided particulate.

Optionally the particles can be rinsed at least once with an additional quantity of the miscible substance, or other liquid in which the perfluorocarbon copolymer is effectively insoluble, residual solvent remaining in the particles being thereby removed.

In one preferred alternate of the invention a particulate insoluble in the solvent and the miscible substance is introduced into the solution prior to introduction of the miscible substance. The introduced particulate performs as a formation site for the perfluorocarbon copolymer precipitating from the solution following introduction of the miscible substance. The particulate can be of any suitable or conventional nature such as an electrocatalyst or a particulate that may later be leached, sublimed, or other vaporized.

The solvent typically is a perhalogenated liquid for situations where the functional group pendant from the copolymeric perfluorocarbon is sulfonyl fluoride or a carboxylate ester. Where the pendant functionality is a carboxylate salt or a sulfonate salt of perfluorocarbon copolymer, the solvent generally is a strongly polar organic substance.

The miscible substance, while virtually infinitely miscible in the solvent, generally possesses essentially no capability for solvating the perfluorocarbon copolymer. Preferably the miscible substance is possessed of a boiling point substantially different from that of the solvent facilitating eventual separation of the solvent and miscible substance for further use.

The above and other features and advantages of the invention will become more apparent when considered in light of a preferred description of the invention following and comprising a part of the specification.

BEST EMBODIMENT OF THE INVENTION

The present invention provides a method for forming miniscule particles of perfluorocarbon copolymer having pendant functionality. By miniscule or quite finely divided, what is meant is particles having an average particle size of between about 0.5 microns and 100 microns, and preferably between about 1 micron and 50 microns, and most preferably not greater than about 25 microns where the particles are to be formed essentially from copolymeric perfluorocarbon having pendant functional groups.

The perfluorocarbon copolymer from which the particles are made generally is a copolymer having an equivalent weight of between about 900 and about 1500, prepared from at least two monomers that include fluorine substituted sites. At least one of the monomers comes from a group that comprises vinyl fluoride, hexafluoropropylene, vinylidene fluoride, trifluoroethylene, chlorotrifluoroethylene, perfluoro (alkyl vinyl ether), tetrafluoroethylene and mixtures thereof.

At least one of the monomers comes from a grouping having members with functional groups capable of imparting cationic exchange characteristics to the final copolymer. Monomers containing pendant sulfonyl, carbonyl or, in some cases phosphoric acid based functional groups are typical examples. Condensation esters, amides or salts based upon the same functional groups can also be utilized. Additionally, these second group monomers can include a functional group into which an ion exchange group can be readily introduced and would thereby include oxyacids, salts, or condensation esters of carbon, nitrogen, silicon, phosphorus, sulfur, chlorine, arsenic, selenium, or tellurium.

Among the preferred families of monomers in the second grouping are sulfonyl or carbonyl containing monomers containing the precursor functional group $SO_2F$, $SO_3$ alkyl, COF, or $CO_2$ alkyl. Examples of members of such a family can be represented by the generic formulas of $CF_2=CFSO_2F$ and $CF_2=CFR_1SO_2F$ where $R_1$ is a bifunctional perfluorinated radical comprising usually 2 to 8 carbon atoms but reaching 25 carbon atoms upon occasion, and wherein the $SO_2F$ group can be replaced by a COF, $CO_2$ alkyl, and $SO_2$ alkyl.

The particular chemical content or structure of the perfluorinated radical linking the functional group to the copolymer chain is not critical but the carbon atom to which the functional group is attached must also have at least one attached fluorine atom. Preferably the monomers are perfluorinated. If the sulfonyl or carbonyl based group is attached directly to the chain, the carbon in the chain to which it is attached must have a fluorine atom attached to it. The $R_1$ radical of the formula above can be either branched or unbranched, i.e., straight chained, and can have one or more ether linkages. It is preferred that the vinyl radical in this group of sulfonyl fluoride or carbonyl fluoride containing comonomers be joined to the $R_1$ group through an ether linkage, illustratively, that the comonomer be of a formula typified by $CF_2=CFOR_1SO_2F$. Illustrative of such sulfonyl or carbonyl fluoride containing comonomers are:

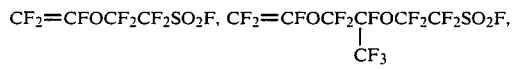

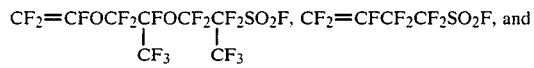

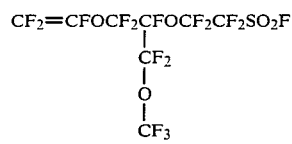

for sulfonyl functionality, and

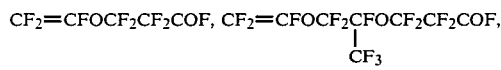

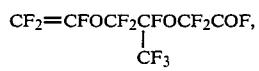

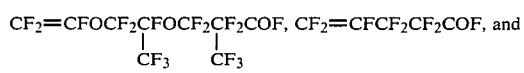

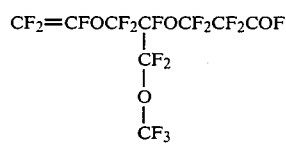

for carbonyl functionality

The corresponding esters, amides, acids and bases of the aforementioned sulfonyl or carbonyl fluorides are equally preferred.

While the preferred intermediate copolymers are perfluorocarbon, that is perfluorinated, others can be utilized where there is a fluorine atom attached to the carbon atom to which the functional group is attached. A highly preferred copolymer is one of tetrafluoroethylene and perfluoro(3,6-dioxa-4-methyl-7-octenesulfonyl fluoride) comprising between 10 and 60 weight percent, and preferably between 25 and 40 weight percent, of the latter monomers.

These perfluorinated copolymers may be prepared in any of a number of well-known manners such as is shown and described in U.S. Pat. Nos. 3,041,317; 2,393,967; 2,559,752 and 2,593,583.

An intermediate copolymer is readily transformed into a copolymer containing ion exchange sites by conversion of the functional groups ($SO_2F$, $COF$, $CO_2$ alkyl, or $SO_3$ alkyl) to the form $SO_3Z$ or $CO_2Z$ by saponification or the like wherein Z is hydrogen, an alkali metal, a quaternary ammonium ion, or an alkaline earth metal. The converted copolymer contains sulfonyl or carbonyl group based ion exchange sites contained in side chains of the copolymer and attached to carbon atoms having at least one attached fluorine atom. Not all sulfonyl or carbonyl groups within the intermediate copolymer need be converted. The conversion may be accomplished in any suitable or customary manner such as is shown in U.S. Pat. Nos. 3,770,547 and 3,784,399.

Methods for providing sulfonamide based ion exchange functionality in, for example, membranes, are shown in U.S. Pat. Nos. 3,969,285 and 4,113,585. Copolymeric perfluorocarbon having pendant carboxylate based cation exchange functional groups can be prepared in any suitable or conventional manner such as in accordance with U.S. Pat. No. 4,151,053 or Japanese patent application No. 52(1977)38486 or polymerized from a carbonyl functional group containing monomer derived from a sulfonyl group containing monomer by a method such as is shown in U.S. Pat. No. 4,151,053. Preferred carbonyl containing monomers include $CF_2=CF-O-CF_2CF(CF_3)O(CF_2)_2\ COOCH_3$ and $CF_2=CF-O-CF_2CF(CF_3)OCF_2COOCH_3$.

Preferred copolymeric perfluorocarbons utilized in the instant invention therefore include carbonyl and/or sulfonyl based or derived groups represented by the formula $-OCF_2CF_2X$ and/or $-OCF_2CF_2Y-O-YCF_2CF_2O-$ wherein X is sulfonyl fluoride ($SO_2F$) carbonyl fluoride (COF) sulfonate methyl ester ($SO_2OCH_3$) carboxylate methyl ester ($COOCH_3$) ionic carboxylate ($COO^-Z^+$) or ionic sulfonate ($SO_3^-Z^+$), Y is sulfonyl or carbonyl ($-SO_2-CO-$) and Z is hydrogen, an alkali metal such as lithium, cesium, rubidium, potassium and sodium, an alkaline earth metal such as beryllium, magnesium, calcium, strontium, barium and radium, or a quaternary ammonium ion.

Generally, sulfonyl, carbonyl, sulfonate and carboxylate esters and sulfonyl and carbonyl based amide forms of the perfluorocarbon copolymer are readily converted to a salt form by treatment with a strong alkali such as NaOH.

Particles of the copolymeric perfluorocarbon are formed by dissolving or solvating the perfluorocarbon copolymer in a suitable solvent to form a solution having at least 0.5% by weight of the perfluorocarbon copolymer. A substance miscible with the solvent, but one in which the perfluorocarbon is substantially insoluble is then identified and the solution is cooled to a temperature below the boiling point of the miscible substance. The miscible substance is then introduced into the solution in at least a 1:1 weight ratio to the solvent resulting in the precipitation of the particles which are recovered using suitable or conventional techniques such as centrifuging, filtration, flocculation, spray drying, and agglomeration. The particles preferably are at least once washed using a suitable or conventional liquid in which the solvent is miscible but the copolymeric perfluorocarbon is not.

Perfluorocarbon copolymer desirably should be prepared for solvation in a particular manner. The use of relatively finely divided particles of the perfluorocarbon copolymer material is important in forming the dispersion, so that chopping or the like from bulk form or sheet stock is desirable. The particles are solvated in a medium that must have significant capability for solvating the perfluorocarbon copolymer particles. A variety of solvents have been discovered for use in solvating perfluorocarbon copolymer for use in this invention; these suitable solvents are tabulated in Table I and coordinated with the perfluorocarbon copolymer having pendant functional groups with which these solvents have been found to be an effective solvent for forming solutions for use in the invention. Since the solvents shown in Table I function effectively alone, or in mixtures of more than one, the term solvent is used herein to indicate a suitable or conventional solvating agent including at least one of the solvents of Table I.

Certain of the solvents of Table I function more effectively with perfluorocarbon having particular metal ions associated with the functional group. For example, N-butylacetamide functions well with the groups COOLi and $SO_3Ca$. SULFOLANE and N,N-dipropylacetamide function well with $SO_3Na$ and $SO_3Li$ functionality.

It is believed that other suitable or conventional perhalogenated compounds can be used for solvating $SO_2F$ or carboxylate ester forms of perfluorocarbon copolymer. It is believed that other suitable or conventional strongly polar compounds can be used for solvating the ionic sulfonate and carboxylate forms of perfluorocarbon copolymer.

the perfluorocarbon, a solution of between 0.5% and 25 weight percent copolymeric perfluorocarbon and preferably 5 to 25% results from copolymer solvation.

After solvation, the perfluorocarbon copolymer is precipitated to form quite finely divided particles. Precipitation is accomplished by introducing into the solution a substance miscible, and preferable essentially infinitely miscible in the solvent. Under most circumstances this miscible substance is a liquid. The miscible substance selected for precipitating the perfluorocarbon copolymer from the solution should also be one in which the copolymeric perfluorocarbon is effectively insoluble, and one not tending to tackify the perfluorocarbon copolymer. Most preferably the miscible substance should be one effectively inert with respect to the perfluorocarbon copolymer excepting for swelling of the perfluorocarbon copolymer that may result due to an uptake of water by the copolymer related to contact with the solvent.

Typically, the miscible substance is an aromatic hydrocarbon, a halogenated hydrocarbon, an ether, an aqueous or non-aqueous solution of an acid, a base, or a salt generally containing a cation other than $Li^+$, or mixtures of any of the foregoing. Suitable aromatic

TABLE I

SOLVENT CROSS REFERENCE TO PERFLUOROCARBON COPOLYMER CONTAINING VARIOUS PENDANT FUNCTIONAL GROUPS

| SOLVENT | FUNCTIONAL GROUP | | | |
|---|---|---|---|---|
| | $SO_2F$ | $COO^-Z^+$ | COO(ester) | $SO_3^-Z^+$ |
| halocarbon oil | X | | X | |
| perfluorooctonic acid | X | | X | |
| perfluorodecanoic acid | X | | X | |
| perfluorotributylamine | X | | | |
| FC-70 available from 3M (perfluorotrialkylamine) | X | | | |
| perfluoro-1-methyldecalin | X | | | |
| decafluorobiphenyl | X | | | |
| pentafluorophenol | X | | | |
| pentaflurorobenzoic acid | X | | | — |
| N—butylacetamide | | X | | X |
| tetrahydrothiophene-1,1-dioxide (tetramethylene sulfone Sulfolane ®) | | | | X |
| N,N—dimethyl acetamide | | | | X |
| N,N—diethyl acetamide | | | | X |
| N,N—dimethyl propionamide | | | | X |
| N,N—dibutylformamide | | | | X |
| N,N—dipropylacetamide | | | | X |
| N,N—dimethyl formamide | | | | X |
| 1-methyl-2-pyrrolidinone | | | | X |

Z is any alkali or alkaline earth metal or a quaternary ammonium ion having attached hydrogen, alkyl, substituted alkyl, aromatic, or cyclic hydrocarbon. Halocarbon oil is a commercially marketed oligomer of chlorotrifluoroethylene.

Solvation is accomplished generally at a temperature in excess of room temperature. For most solvents a temperature of between about 50° C. and 250° C. is desirable to achieve at least a 0.5 weight percentage of the perfluorocarbon copolymer in the solvent. Heat in excess of about 300° C. is undesirable as tending to detract from functionality of the perfluorocarbon copolymer. Temperature in excess of the boiling point of the particular solvent selected may be found to be dysfunctional as may temperatures at which the solvent is possessed of a substantial vapor pressure.

The copolymeric perfluorocarbon being solvated should generally be relatively finely divided. The rate of dissolution is thereby enhanced as a result of the copolymeric perfluorocarbon having a relatively large surface to mass ratio. Chopping, shearing and the like can be used to relatively finely divide the perfluorocarbon for solvation. Depending upon the solvent, and particularly the capability of the solvent for solvating hydrocarbons include toluene, xylene, or benzene. Suitable halogenated hydrocarbons include dichloroethyane, carbon tetrachloride, and bromoform. Suitable aqueous or nonaqueous solutions of acids, bases, or salts include 10% by weight HCl in water, and 30% by weight potassium hydroxide in either water or methanol. Suitable ethers include 1-4-dioxane, tetrahydrofuran, and diethylether, these substances having the desired properties generally of being substantially miscible with the solvents of Table I and being substantially inert except as to water uptake with regard to the perfluorocarbon copolymers being contemplated for solvation within the purview of this invention.

The miscible substance is added to the solution in a quantity, preferably, at least equal to the weight of solvent present in the solution. While a lesser quantity of the miscible substance can be used, a corresponding reduction in particulate perfluorocarbon copolymer produced can be expected. In much preferred embodiments, a sufficient quantity of the miscible substance is added to the solution to effectively precipitate virtually all the copolymeric perfluorocarbon present in the solution.

It is desirable, when adding the miscible substance that the solution be below the boiling point of the miscible substance. In some instances, however, it may be desirable that the miscible substance be, in some part, boiled from the solution to promote turbulence, and thus aid in establishing a desirable particle size for the perfluorocarbon copolymer being precipitated from the solution. In preferred embodiments, however, the solution is cooled to a temperature at least below the boiling point of the miscible substance before the miscible substance is added. Often this temperature can be 80° C. or lower.

The miscible substance preferably should be selected to be relatively easily recoverable from the solvent. Selection of a miscible substance having a substantially different boiling point from the solvent facilitating distillation recovery, or a substantially different melting point facilitating crystallative separation may be desirable.

The miscible substance may be added to the solution relatively rapidly, or more slowly. As the miscible substance is added, the perfluorocarbon copolymer precipitates from the solution. The particle size of particles of the perfluorocarbon copolymer formed during precipitation can vary from about 0.5 microns to about 100 microns and preferably from about 1.0 micron to about 50 microns with particles not larger than about 25 microns being most preferred. It is believed that the physical size of particles of the copolymeric perfluorocarbon being formed can, to some extent be controlled within these size ranges. One factor useful in regulating particle size is the length of time the particle remains in the solution and is thus available as a deposition site. Another factor appears to be in part a dependence upon the presence of a seed object.

While no seed object is required for implementing the invention, use of a seed object may be desirable depending upon the ultimate end use of the particulate copolymeric perfluorocarbon being precipitated. For example, where the particles are to be utilized for catalysis, a porous silica catalyst carrier such #6596 available from United Catalysts Inc. can be introduced into the solution prior to introduction of the miscible substance. The resulting catalyst perfluorocarbon copolymer particles include perfluorocarbon copolymer at least partially surrounding the silica particles, and embody a relatively elevated catalyst surface area using a reduced volume of perfluorocarbon copolymer catalyst. Metal, or metal oxide powders can be utilized for seed particles, and can add gas release, conductivity enhancing, or catalytic enhancing properties to the particles. Amorphous silica, a valve metal oxide such as titanium or zirconium oxide or a suitable or conventional particulate such as the oxides, hydroxides, nitrates, or carbides of Ti, Zn, Nb, Ta, V, Mn, Mo, Sn, Sb, W. Bi, In, Co, Ni, Be, Al, Cr, Fe, Ga, Ge, Se, Y, Ay, Hf, Pb or Th, and mixtures thereof can provide advantages when used as a seed. Oxides of the platinum group metal, platinum, rhodium, ruthenium, iridium, palladium, platinum and osmium can also find utility. Naturally, any such particulate should be smaller than the dimension desired in any final particle of the copolymeric perfluorocarbon.

A third factor that appears to be useful in establishing and controlling the size of particles produced during the precipitation appears to be an interrelationship between the solvent and the miscible substance introduced into the solvent together with the nature of the perfluorocarbon copolymer and particularly, the pendant functionality of the perfluorocarbon copolymer. For example, where the perfluorocarbon includes pendant functionality based upon a lithium sulfonate, solvated in SULFOLANE and precipitated with toluene, the size of particles produced by precipitation lies in the range of between 5 and 15 microns, and generally between 6 and 10 microns. The size of particles produced by precipitation can be expected to be variable with the nature of the solvent, the nature of the miscible substance, and the nature of the perfluorocarbon polymer being precipitated. For any particular combination of these factors, the particular particle size produced by precipitation is best confirmed by trials. In many cases, particles precipitated by use of an acid or base tend to be somewhat smaller in size.

After forming, the particles of the perfluorocarbon copolymer can be separated from the solution by any suitable or conventional particle separation technique such as filtration, decantation, centrifuging, flocculation, spray drying, agglomeration and the like. Also after formation the particles preferably should be at least once washed to remove any residual solvent. Failure to remove residual solvent can result in tacky particles that coadhere. Washing can be accomplished with any liquid relatively uncontaminated by the solvent. Water, alcohols and liquids that would suffice for use as a miscible substance are suitable for washing. Once washed, the particles are generally dried, preferably under a vacuum, and at a temperature not exceeding about 300° C. to yield a dried powder.

The resulting particles can be tacified for coadhering into a structure by blending with a small amount of a solvent to form a paste.

Perfluorocarbon copolymer for forming particles according to this invention, need not be virgin material. One excellent source of perfluorocarbon copolymeric material for use in forming particles according to the instant invention is membranes of perfluorocarbon copolymer removed from chloralkali cells. Such membranes are typically used to separate anode and cathode compartments within a chloralkali cell. From time to time, these membranes fail, and require replacement. The membrane material may be chopped, and then formed into particles according to the instant invention.

Some membranes used in such chloralkali cells include perfluorocarbon polymer having two or more different pendant functional groups. For example, one portion of the membrane may include perfluorocarbon having pendant functional groups derived from carbonyl fluoride, while another portion of the membrane may have pendant functional groups derived from sulfonyl fluoride. The differing copolymer perfluorocarbons can be separately formed into particles by relatively finely dividing the membrane material and contacting the relatively finely divided material first with a solvent capable of solvating one of the perfluorocarbon copolymer materials, but not the other. Prior to precipitation, the particles of perfluorocarbon copolymer insoluble in that solvent are removed, and then precipitation, separation and washing of quite finely divided particles of the soluble perfluorocarbon copolymer is conducted. Subsequently the particles of the insoluble perfluorocarbon copolymer can be separately solvated and processed to quite finely divided particles according to the instant invention.

The following examples are offered to further illustrate the invention.

EXAMPLE I

Perfluorocarbon copolymer having an equivalent weight of 1100, and pendant functionality of the form $SO_3H$ was contacted with lithium hydroxide to convert the perfluorocarbon copolymer to pendant functionality having the form $SO_3Li$. 31 grams of the resulting lithium sulfonate form of the perfluorocarbon copolymer was dissolved in 280 grams of SULFOLANE by stirring the perfluorocarbon copolymer with the SULFOLANE at 260° C. for 3 hours under a nitrogen purge. Any SULFOLANE evaporating during dissolution of the copolymer perfluorocarbon was condensed and returned. 200 ml of the resulting approximately 10% perfluorocarbon copolymer solution in SULFOLANE was added to approximately 200 ml of toluene to yield a turbid mixture. The turbid mixture was placed in a 500 ml separatory funnel with approximately 100 ml of ice cold distilled water and shaken vigorously. Toluene was decanted from the separatory funnel, 100 ml of fresh toluene was added to the separatory funnel and the separatory funnel was again shaken. Any toluene was decanted again from the separatory funnel, 250 ml of ice cold water was added to the separatory funnel, and the separatory funnel was again shaken to separate residual toluene. A mass of discreet, quite finely divided particles of perfluorocarbon copolymer having pendant lithium sulfonate functionality resulted.

EXAMPLE II 6 grams of the approximately 10% perfluorocarbon copolymer solution of Example I was combined with 50 ml of toluene under moderate agitation in the presence of 5.4 grams of INCO ® 255 powder available from International Nickel Corp. The resulting copolymeric perfluorocarbon coated precipitated nickel powder was filtered from the combined toluene and SULFOLANE, vacuum dried at 50° C. for six hours, and redispersed in 4 grams of SULFOLANE at high speed for 5 minutes at room temperature. The redispersed perfluorocarbon polymer was cast onto aluminum foil over a vacuum table using a Gardner knife at a 2 mil setting. A 2 mil thick decal resulted that could be adhered to a perfluorocarbon copolymer membrane using heat and/or pressure. Adhered to the membrane, and installed in a chloralkali cell, the decal functioned as a cathode.

EXAMPLE III

Example II was repeated except that the redispersed perfluorocarbon polymer was cast onto a perfluorocarbon copolymer membrane producing a membrane having an attached perfluorocarbon copolymer decal that functioned as a cathode when installed in a chloralkali cell.

EXAMPLE IV

Two grams of IMSIL ®A-10 amorphous silica available from Illinois Materials Corporation was blended at high speed for five minutes with 10 grams of the perfluorocarbon copolymer solution in SULFOLANE of Example I. The resulting blend was ice bath cooled and rapidly combined with 400 ml of toluene. The combined mixture was moderately stirred for five minutes, decanted, and the resulting particles twice extracted with 400 ml aliquots of toluene. The resulting amorphous silica particles coated with perfluorocarbon copolymer were vacuum dried at room temperature.

While a preferred embodiment of the invention has been shown and described in detail, it should be apparent that various alterations and modifications may be made thereto without departing from the scope of the claims that follow.

What is claimed is:

1. A method for making particles in a size range of from about 0.5 microns to about 100 microns of a perfluorocarbon copolymer, the copolymeric perfluorocarbon being a copolymer of two monomers, one monomer being selected from a group consisting of vinyl fluoride, hexafluoropropylene, vinylidene fluoride, trifluoroethylene, chlorotrifluoroethylene, perfluoro(alkylvinyl ether), tetrafluoroethylene and mixtures thereof, the second monomer being selected from a group of monomers containing at least one of a pendant $SO_2F$ based functional group and a pendant COF based functional group, the second monomer being represented by the generic formula $CF_2=CFR_1SO_2F$ or $CF_2=CFR_1COF$, with $R_1$ being a bifunctional perfluorinated radical comprising generally 1 to 8 carbon atoms, the carbon atom adjacent the $SO_2F$ or COF based group having at least one attached fluorine, the copolymeric perfluorocarbon having an equivalent weight of at least about 900, but not greater than about 1500, the method comprising:

dissolving the copolymeric perfluorocarbon in a quantity of a solvent selected from a group consisting of halocarbon oil, perfluorooctonic acid, perfluorodecanoic acid, perfluorotributylamine, perfluorotrialkylamine, perfluoro-1-methyldecalin, decafluorobiphenyl, pentafluorophenol, pentafluorobenzoic acid, N-butylacetamide, tetrahydrothiophene-1,1-dioxide, N,N-dimethyl acetamide, N,N-diethyl acetamide, N,N-dimethyl propionamide, N,N-dibutylformamide, N,N-dipropylacetamide, N,N-dimethyl formamide, 1-methyl-2-pyrrolidinone and mixtures thereof, at a temperature at least in excess of room temperture but not greater than about 300° C. to achieve a solution of at least 2% by weight of the copolymeric perfluorocarbon in the solvent;

identifying a liquid substance miscible with the solvent in which the perfluorocarbon copolymer is essentially insoluble, and selected from a group consisting of aromatic hydrocarbons, halogenated hydrocarbons, ethers, aqueous and non-aqueous solutions of acids, bases and salts and mixtures thereof;

reducing the temperature of the solution to a point at least below the boiling point of the liquid substance; and combining the miscible substance with the solution to precipitate the copolymeric perfluorocarbon from the solution as a quite finely divided particulate.

2. The method of claim 1, the miscible substance being combined with the solution in a weight ratio of at least one part miscible substance to one part solvent.

3. The method of claim 1, a particulate being introduced into the solution prior to introduction of the miscible substance.

4. The method of claim 2, a particulate being introduced into the solution prior to introduction of the miscible substance.

5. The method of claim 3, the particulate being an electrocatalyst.

6. The method of claim 4, the particulate being an electrocatalyst.

* * * * *